UNITED STATES PATENT OFFICE.

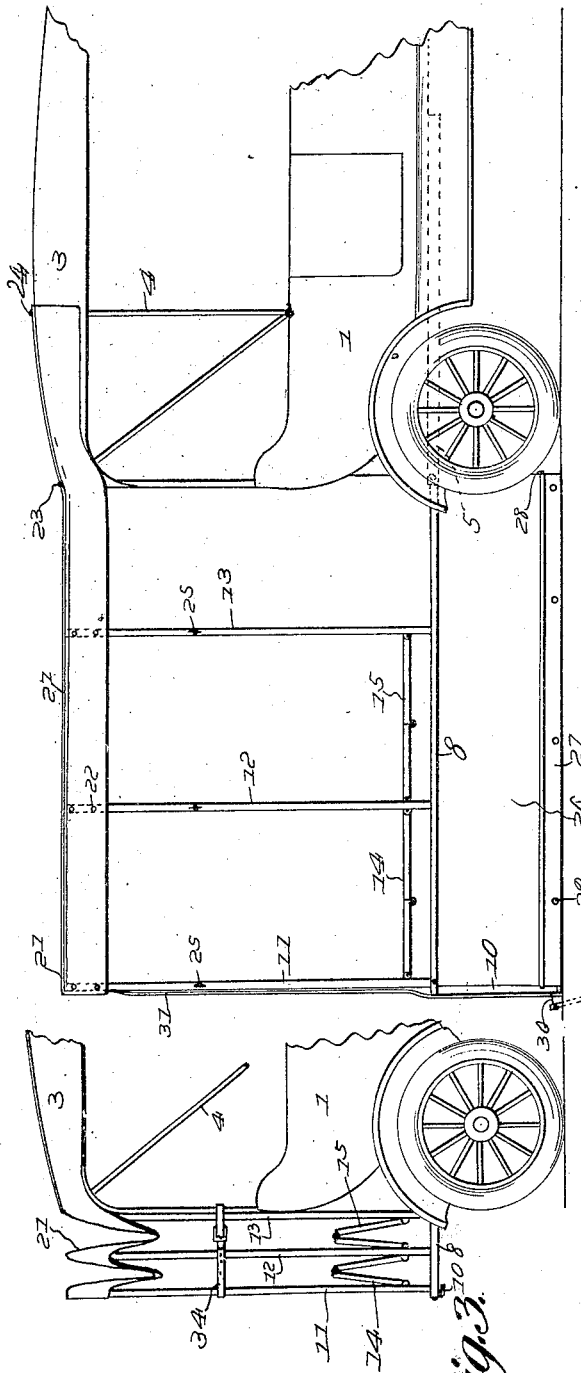
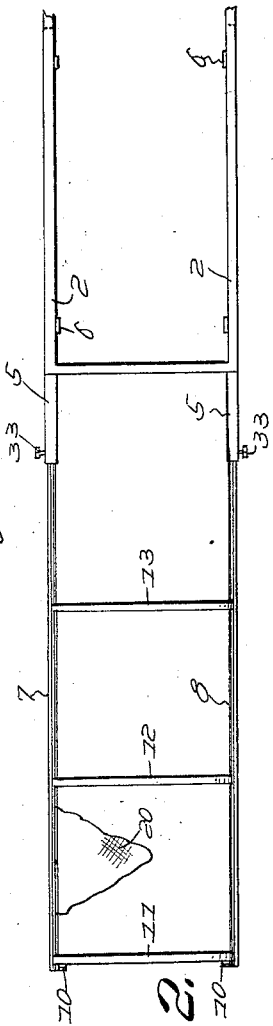

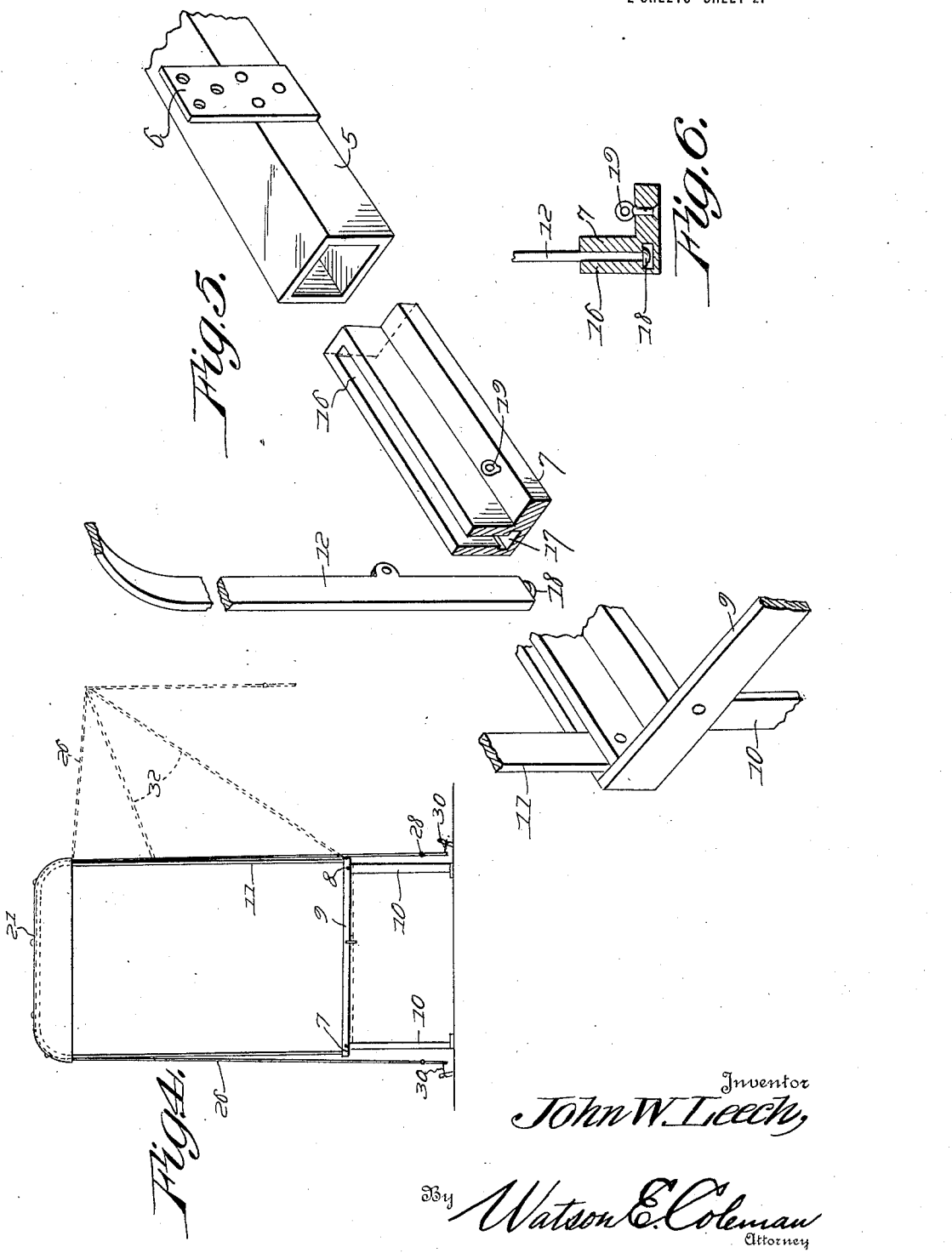

JOHN W. LEECH, OF SALINA, KANSAS.

AUTOMOBILE ATTACHMENT.

1,427,749.  Specification of Letters Patent.  Patented Aug. 29, 1922.

Application filed August 17, 1921. Serial No. 492,972.

*To all whom it may concern:*

Be it known that I, JOHN W. LEECH, a citizen of the United States, residing at Salina in the county of Saline and State of Kansas, have invented certain new and useful Improvements in Automobile Attachments, of which the following is a specification, reference being had to the accompanying drawings.

This invention relates to automobile attachments, and more particularly to cot or bed attachments, having for its principal object a simple and efficient arrangement whereby the cot or bed may be placed in operative position or collapsed to an out of the way position on the machine for traveling.

A further object of the invention is to provide a cot or bed which may be moved to operative and inoperative positions in a minimum length of time, and which when in inoperative position is compactly arranged taking up little space and in no way interfering with the operation of the vehicle.

A still further object of the invention is the provision of a cot or bed attachment which may be, if desired, utilized as a luggage carrier.

Further objects of the invention will appear as the following specific description is read in connection with the accompanying drawings which form a part of this application and in which:

Figure 1 is a side elevation;

Figure 2 a bottom plan view showing the position of the parts with relation to the chassis;

Figure 3 is a detail elevation showing the parts in collapsed position;

Figure 4 is a rear elevation showing one of the side curtains used as an awning;

Figure 5 is a detail perspective view showing the parts arranged for assembly; and Figure 6 is a detail sectional view showing the method of connecting the bows to the side bars.

Referring more particularly to the drawing, the numeral 1 indicates the body of an automobile, 2 the side bars of the chassis and 3 the top which is supported by the usual bows 4.

The attachment comprises the following parts secured to and arranged on the machine as will be now described. Mounted beneath each of the side bars is a rectangular tube 5 which tubes are preferably attached to the side bars of the chassis by means of a plate 6 or in any other manner found most suitable to the particular type of machine upon which the device is placed. These tubes have slidably mounted therein the side bars 7 and 8 constituting the side bars of the cot or bed which are connected together at their rear or outer ends by a cross bar 9 and when in extended position are supported from the ground by the hinged legs 10 pivoted to the cross bar and arranged to occupy the position shown in dotted lines in Figure 4 when the attachment is in inoperative position. Secured to the side bars 7 and 8 at the rear or outer ends thereof and adjacent the cross bar 9 is a stationary bow 11, and slidably connected with the bars 7 and 8, as will be hereinafter described, are the movable bows 12 and 13 connected to the bow 11 and to each other by the folding braces 14 and 15 so as to be held in proper spaced relation, as will be readily understood. Each side bar preferably is formed of angle iron, as shown in Figure 5, with the vertical leg thereof provided with a longitudinal slot 16 enlarged at its base, as shown at 17, to receive the headed studs 18 carried by the lower ends of the bows 12 and 13.

Both side bars have secured thereto at suitable intervals eye bolts 19 to which may be attached a heavy canvas or like material 20 stretched across between the side bars so as to form a cot or bed, as will be readily understood. If desired, slats may be carried with the attachment and bridged across the space between the side bars 7 and 8 resting upon the horizontal flanges of the side bars, as is customary in a slat bed. Permanently secured over the bight of the bow 11 is a top covering 21. This covering extends down over the side of the bows some six or eight inches and is removably connected by means of the fastening devices 22 to the bows 12 and 13 at the inner end. The covering is connected temporarily by fastening devices 23 and 24 to the rear bow and to the top covering of the automobile over the bow 4, as shown in Figure 1. I also provide on the bows 11, 12 and 13 suitable turn buttons 25 by which the side curtains 26 may be temporarily secured, as in an ordinary automobile construction, such side curtains, as shown, being provided adjacent their lower edges with a hem 27 in which a stiffening rod 28 is secured and also with grommets 29 arranged to receive staking ropes, indicated at 30. The back bow 11 is also preferably provided with a back curtain 31 which is permanently attached at its upper edge to the bow and detachably engaged with the lower portion of the bow so that it may be rolled up to an out of the way position when the attachment is collapsed, as will be hereinafter described, so as to leave an unobstructed view through the rear curtain window of the automobile.

As shown in Figure 4, the side curtains may be held outwardly in the form of an awning by means of braces 32 so as to be utilized as a dining or cooking fly.

When the device is in inoperative position, the side bars 7 and 8 are telescoped within the tubes 2 with the bows 11, 12 and 13 arranged closely adjacent each other and the braces 14 and 15 occupying the position shown in Figure 3. In this position the parts are held by means of set screws 33 which are threaded into the ends of the tubes and adapted to jam against the outer faces of the side bars 7 and 8. These set screws also provide means for holding the side bars in any adjusted position, as will be readily understood.

When it is desired to utilize the device as a luggage carrier, the braces 14 and 15 are collapsed and the bows brought together but the side bars are allowed to remain projected for a distance equal to the distance between the ends of the tubes and the bow 13 when in fully extended position. The canvas 20 is then stretched across between the side bars 7 and 8 between the ends of the tubes and the bow 13 and the rods 28 are removed from the side curtains so as to permit folding of the surplus, as will be readily understood. When in this position, luggage may be placed upon the canvas 20 and strapped in position in any suitable manner. It will be fully protected by the top and side and back curtains, as will be readily understood.

When the tourist decides to stop for the night and to pitch his camp, the machine is stopped on relatively level ground and the side bars 7 and 8 fully extended and the set screws clamped upon the side bars to hold them stationary with the tubes, the legs 10 are lowered, thus forming a support for the free end of the side bars and the canvas 20 is stretched across the side bars, or mattress receiving slats placed in position on the horizontal flanges of the side bars, if such a support is desired. The side curtains are then attached and if desired staked down to the ground so as to prevent animals or reptiles from crawling beneath the bed or cot, as will be readily understood. The back curtain is also secured in a similar manner, and the cot or bed is then ready for occupancy.

When it is desired to utilize the side curtains for a cooking or dining fly, the braces 32 are employed, as in Figure 4, and it will of course be understood that these braces may be longer or shorter so as to provide for a greater or less width of awning in accordance with the wishes of the tourist.

When the device is in collapsed position, the bows are held in collapsed position parly by the set screws and by a strap 34 which is connected to the rear bow of the machine and passes around the bow 11, as shown in Figure 3.

What I claim is:

1. An attachment for motor vehicles comprising telescopic bars, means for securing one of the bars beneath the body of the machine, top supporting bows carried by and slidably engaged with the other bar, and a top cover connected with said bows and with the top of the vehicle.

2. An attachment for motor vehicles, comprising spaced tubes secured to the under side of the vehicle, connected bars slidably mounted in said tubes, top supporting bows slidably engaged with said bars, and a top cover connected to the bows and to the top of the machine.

3. An attachment for motor vehicles comprising spaced tubes secured to the under side of the vehicle, connected bars slidably mounted in said tubes, top supporting bows slidably engaged with said bars, and a top cover connected to the bows and to the top of the machine, together with means for holding the bars in adjusted position with the top.

4. In an attachment for motor vehicles, a pair of spaced tubes secured beneath the body of the vehicle, connected side bars slidably mounted in the tubes, a bow stationary with the side bars, other bows slidably mounted upon the side bars, and a top cover connected to all of the bows and to the top of the vehicle.

5. An attachment for motor vehicles comprising a pair of tubes secured beneath the body of the vehicle, connected side bars slidably mounted in said tubes, means carried by the tubes for holding the side bars in adjusted position therewith, a stationary top supporting bow secured to the side bars, other bows slidably mounted upon the side bars, means for bracing said bows and holding them in spaced relation, and a top cover connected to the bows and removably connected to the top of the vehicle.

6. An attachment for motor vehicles comprising a pair of spaced tubes secured beneath the body of the vehicle, a pair of spaced longitudinally slotted side bars telescopically mounted in the tubes, means for holding the side bars in adjusted position in the tubes, a top supporting bow stationary with the side bars, top supporting bows slidably mounted in the slots of the side bars, means for preventing disengagement of the slidably mounted bows from the side bars, and a top cover connected to the bows and to the top of the vehicle.

7. An attachment for motor vehicles comprising telescopic bars, means for securing one of the bars beneath the body of the machine, top supporting bows carried by and slidably engaged with the other bar, a top cover connected with said bows and with the top of the vehicle, and a mattress supporting element connected to the side bars and bridging the space therebetween.

8. An attachment for motor vehicles comprising an extensible bed shiftable to operative or inoperative positions, a collapsible top therefor, and means carried by the bed and supporting the top when the bed is in either of said positions.

9. An attachment for motor vehicles comprising a support secured beneath the body of the vehicle, an extensible bed connected to the support, a collapsible top carried and supported by the bed, said bed arranged to be positioned beneath the body of the vehicle when in inoperative position, and said top adapted to be collapsed against the rear of the vehicle when in inoperative position.

10. An attachment for motor vehicles comprising a support secured beneath the body of the vehicle, a bed telescopically connected with the support, means for supporting the free end of the bed when in operative position, top supporting members collapsible upon the rear of the vehicle when in inoperative position, and a top cover secured to the supporting members and to the top of the vehicle.

11. An attachment for motor vehicles comprising an extensible bed shiftable to operative and inoperative positions, a collapsible top therefor, and means carried by and shiftable upon the bed supporting the top when the bed is in either of said positions.

In testimony whereof I hereunto affix my signature.

JOHN W. LEECH.